United States Patent
Winn

(10) Patent No.: US 9,649,715 B2
(45) Date of Patent: May 16, 2017

(54) PULSE WIDTH MODULATION CONTROL OF GAS FLOW FOR PLASMA CUTTING AND MARKING

(75) Inventor: Jackie Winn, Mt. Pleasant, SC (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 1277 days.

(21) Appl. No.: 12/649,727

(22) Filed: Dec. 30, 2009

(65) Prior Publication Data

US 2011/0155702 A1 Jun. 30, 2011

(51) Int. Cl.
*B23K 10/00* (2006.01)
*H05H 1/34* (2006.01)

(52) U.S. Cl.
CPC ............. *B23K 10/006* (2013.01); *H05H 1/34* (2013.01)

(58) Field of Classification Search
CPC .................................................... B23K 10/006
USPC ............. 219/121.39, 121.44–121.46, 121.55
See application file for complete search history.

(56) References Cited

U.S. PATENT DOCUMENTS

| | | |
|---|---|---|
| 4,133,988 A | 1/1979 | Esibyan et al. |
| 5,355,214 A | 10/1994 | Hammer |
| 5,599,469 A | 2/1997 | Yoshino |
| 5,660,745 A | 8/1997 | Naor |
| 5,828,030 A | 10/1998 | Naor |
| 6,054,670 A | 4/2000 | Naor |
| 6,242,710 B1 | 6/2001 | Naor |
| 6,274,841 B1 | 8/2001 | Ramakrishnan et al. |
| 6,294,764 B1 | 9/2001 | Lindner et al. |
| 6,326,583 B1 | 12/2001 | Hardwick et al. |
| 6,444,943 B2 | 9/2002 | Barnett |
| 7,326,875 B2 | 2/2008 | Krink et al. |
| 7,393,561 B2 | 7/2008 | Paranjpe |
| 2006/0091115 A1 | 5/2006 | Higgins et al. |
| 2006/0163220 A1 | 7/2006 | Brandt et al. |
| 2008/0006614 A1 | 1/2008 | Brandt et al. |
| 2008/0115862 A1 | 5/2008 | Danzer |
| 2008/0169272 A1 | 7/2008 | Brandt et al. |
| 2008/0209807 A1 | 9/2008 | Tsangaris et al. |
| 2008/0210670 A1 | 9/2008 | Brandt et al. |
| 2008/0293000 A1 | 11/2008 | Gum |
| 2009/0294415 A1 | 12/2009 | Salsich et al. |

OTHER PUBLICATIONS

PCT International Search Report for PCT/US2010/061449, dated Mar. 2, 2011.
Extended European Search Report. Application No. 10841567.0, dated Apr. 30, 2015.

*Primary Examiner* — Anh Mai
(74) *Attorney, Agent, or Firm* — Dority & Manning, P.A.

(57) ABSTRACT

Gas flow control for a plasma arc torch is provided. More particularly, a method and apparatus to modulate the pressure and flow from a plasma arc torch is provided. Cyclic pulsing of a flow control valve between states of fully open and fully closed provides for a relatively constant flow of plasma gas to the torch at a relatively constant pressure.

17 Claims, 2 Drawing Sheets

PULSE WIDTH MODULATION CONTROL OF GAS FLOW FOR PLASMA CUTTING AND MARKING

FIELD OF THE INVENTION

The present invention relates to gas flow control for a plasma arc torch and, more particularly, to modulating the pressure and flow to a plasma arc torch through cyclic pulsing of a flow control valve between states of fully open and fully closed.

BACKGROUND OF THE INVENTION

The basic components of a conventional plasma arc torch includes a body, an electrode mounted in the body, a nozzle defining an orifice for a plasma arc, a source of ionizable gas, and an electrical supply for producing an arc in the gas. Upon start-up, an electrical current is supplied to the electrode (generally a cathode) and a pilot arc is initiated in the ionizable gas typically between the electrode and the nozzle, the nozzle defining an anode. A conductive flow of the ionized gas is generated from the electrode to the work piece, wherein the work piece then defines the anode, and a plasma arc is thus generated from the electrode to the work piece.

The pressure and flow of gas to the torch must be precisely controlled during start-up, operation, and shut down. Such control has previously been undertaken by a variety of methods including e.g., using a fixed orifice with a by-pass valve or a motor controlled pressure regulator. However, these conventional approaches can be problematic. For example, a fixed orifice provides only a fixed flow rate for a specific inlet pressure while motor controlled regulators add significant complexity and cost to a plasma arc torch system.

Accordingly, a control system for a plasma arc torch that can modulate both gas pressure and flow would be useful. A flow control system for a plasma arc torch that modulates both gas pressure and flow without adding undue complexity and cost to a plasma arc torch system would also be useful. These and other advantages of the present invention will be apparent from the description that follows.

SUMMARY OF THE INVENTION

Objects and advantages of the invention will be set forth in part in the following description, or may be obvious from the description, or may be learned through practice of the invention.

In one exemplary aspect of the present invention, a method is provided for controlling gas flow to a plasma arc torch. The method can include the steps of providing a plasma gas supply in communication with the plasma arc torch, positioning a valve between the plasma gas supply and the plasma arc torch so as to control the flow of plasma gas to the torch, cycling the valve at a predetermined frequency between conditions of fully opened and fully closed, and maintaining a relatively constant flow of plasma gas to the plasma torch during the step of cycling the valve.

The cycling step may also include sending a signal to the valve. The signal may be a step function signal. The frequency of the signal, duty of the signal, or both may be determined based on the pressure of the gas supplied to the inlet of the valve. The method may also include changing the flow of gas to the plasma torch by changing the duty of the signal over a predetermined time interval, regulating the pressure to an inlet of the valve to a predetermined value, dampening the flow of gas between the valve and the torch, measuring the pressure at an inlet of the valve, and/or maintaining a relatively constant pressure of plasma gas at the torch. The valve may be a solenoid valve or other valve that can be cycled between fully open and fully closed.

In another exemplary embodiment of the present invention, a plasma arc torch system is provided that includes a plasma arc torch, a gas flow valve connected to the torch by a gas supply line, a controller connected to the gas flow valve, the controller configured to provide a signal to the gas flow control valve whereby the valve is cycled between conditions of fully opened and fully closed so as to maintain a substantially constant flow of gas to the plasma arc torch.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
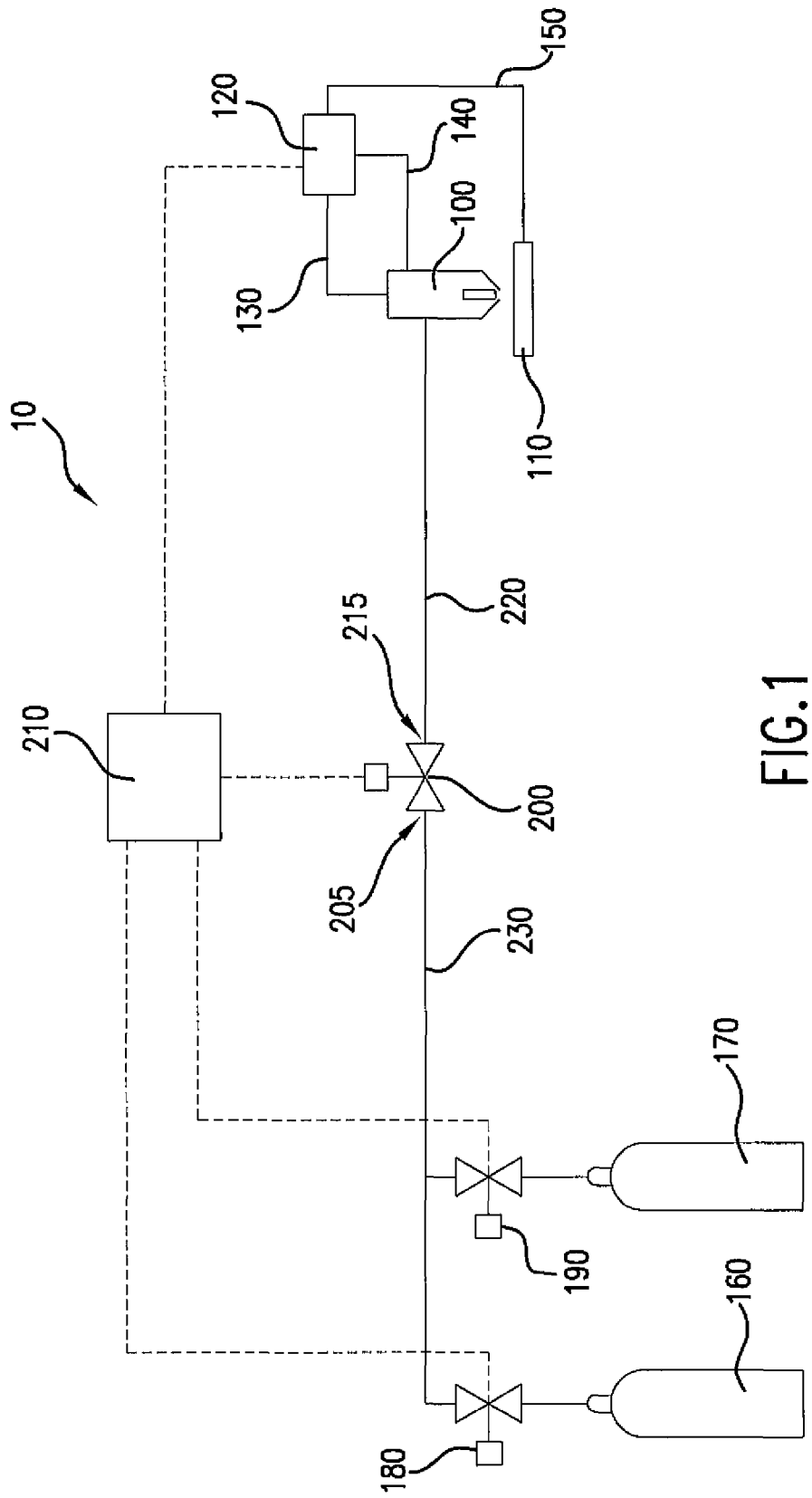
FIG. 1 illustrates a schematic view of an exemplary embodiment of a plasma arc torch system as may be used with the present invention.

The present invention relates to gas flow control for a plasma arc torch that allows modulating both the pressure and flow through cyclic pulsing of a flow control valve between states of fully open and fully closed. For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

FIG. 1 provides a schematic representation of an exemplary embodiment of a plasma arc torch system 10 of the present invention. A plasma arc torch 100 is positioned adjacent to a work piece 110 for cutting or marking. A power supply 120 is configured with both the torch 100 and the work piece 110 such that after initiation of a pilot arc through connections 130 and 140, the arc can be transferred to work piece 110 and a current sustained through connections 130 and 150.

A preflow gas supply 160 and plasma gas supply 170 are connected to the torch 100. Regulators 180 and 190 may be provided to regulate and switch between a preflow gas supply 160 and plasma gas supply 170. In a manner that will be described, valve 200 controls the pressure and flow of gas to torch 100. Valve 200 is an electromechanical device such as e.g., a solenoid valve. As shown in FIG. 1, valve 200 is connected to torch 100 through gas hose 220. Controller 210 is connected to power supply 120 and valves 180, 190, and 200 to provide for the precise operation of plasma arc torch system 10. FIG. 1 is provided by way of example only—various other configurations for controller 210, gas supplies 160 and 170, as well as regulators 180 and 190 may be used upstream of valve 200.

In operation of system 10, regulators 180 and/or 190 are used to provide a selected pressure of gas to the inlet 205 of valve 200 by way of line 230. Although not shown in FIG. 1, if desired, a pressure sensor can be placed at the inlet 205 of valve 200 to provide a real time measurement to controller 210. Knowing this gas input pressure, controller 210 is used to pulse valve 200 at an appropriate duty cycle and frequency so that a predetermined average gas pressure is provided at the outlet 215 of valve 200. As a result, the gas flow to the torch 100 is further controlled through the resistance to flow provided by torch 100 and gas hose 220. By pulsing valve 200 open or closed at the appropriate rate, the flow to torch 100 can be controlled to the precise levels needed for starting torch 100 using a pilot arc, transferring the are to work piece 110, and then operating torch 100 to cut or mark work piece 110.

It should be noted that valve 200 is instructed by controller 210 to fully open or fully close. Being an electromechanical device, valve 200 (i.e., the coil of valve 200) has an associated inductance such that by pulsing the coil at an appropriate rate, a continuous current flow could be obtained so that the valve does not fully open or close but instead remains open under a continuous force. However, the present invention uses a signal to valve 200 such that valve 200 is fully opened and fully closed during operation.

Figure 2:
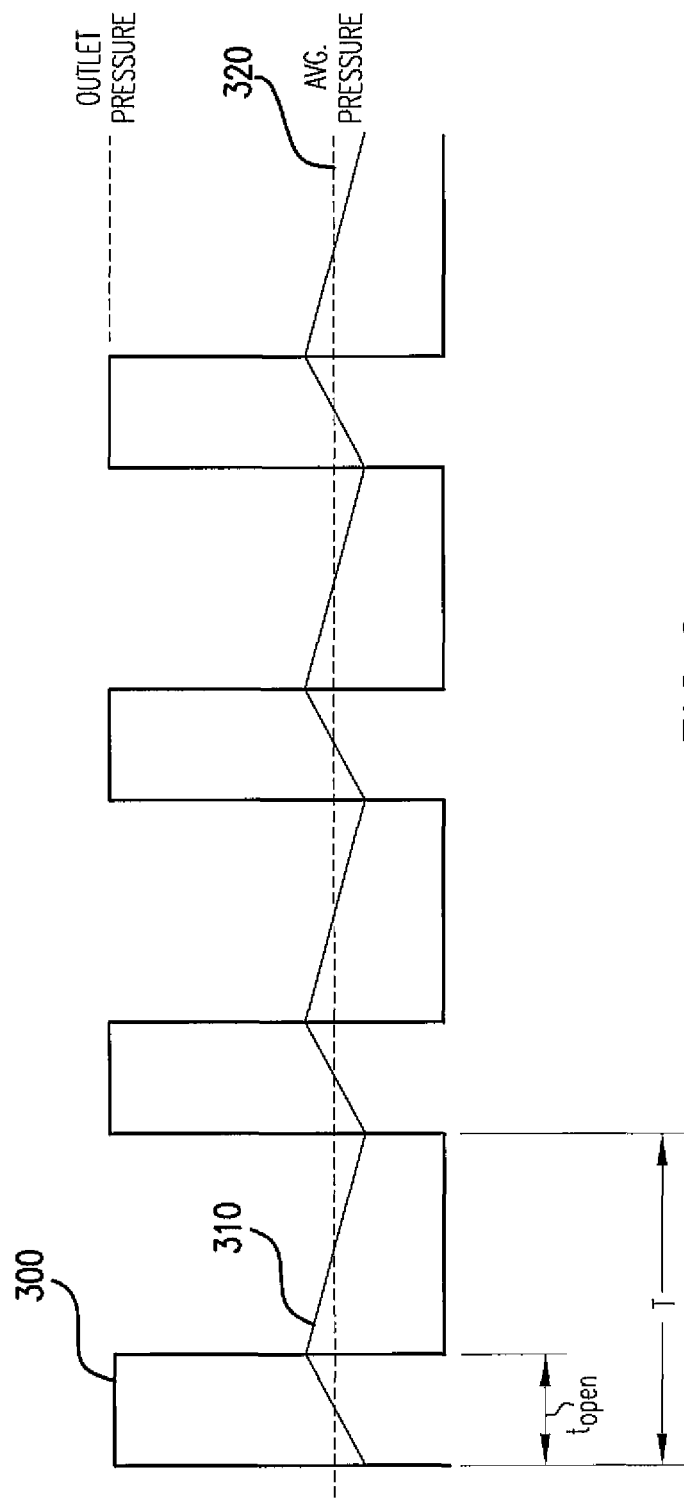
FIG. 2 illustrates a plot of waveforms that may be used with the present invention as will be further explained in the discussion that follows.

More particularly, referring now to FIG. 2, waveform 300 shows the pressure at the outlet 215 of valve 200 when controller 210 commands cycles of fully open and then fully closed for valve 200—i.e., pulse width modulation of valve 200. Waveform 300 could also be described as a series of step function changes between fully open and fully closed. FIG. 2 also shows the resulting pressure at torch 100. Due to the resistance in flow provided by the gas hose 220 and torch 100, and the volume associated with the length of gas hose 220, the pressure obtained at the torch 100 can be controlled to a relatively constant level as shown by waveform 310 to provide an average pressure as shown by line 320. More specifically, the volume (e.g., the cross-sectional internal area×length) of the gas hose between the valve and the torch has a dampening effect so as to reduce the size of fluctuations in the pressure of the gas at the torch. For example, typically gas flow hose 220 can have a length in the range of about 15 feet to 50 feet and in internal diameter of about 0.25." A larger hose with a larger volume will increase the dampening effect.

As also referred to in FIG. 2, $t_{open}$ represents the time valve 200 is open while T represents the time for a complete cycle of fully opening and fully closing the valve. As such, the "duty" cycle is calculated at the quotient $t_{open}/T$. Accordingly, knowing the input pressure to valve 200 at inlet 205, the average pressure at torch 100 can be controlled by pulsing valve 200 at an appropriate duty cycle and frequency. More specifically, the average pressure represented by waveform 310 is a function of the pressure at valve inlet 205, the duty, and the resistance to flow provided by hose 220 and torch 100. By adjusting the duty, optimal flow for starting, pilot arc, and transferring arc modes for both cutting and marking can be obtained even though different flows may be needed for each such mode of torch 100 operation.

FIG. 2 is provided by way of illustration only. Other profiles for gas flow may also obtained by cycling valve 200 between fully open and fully closed. For example, the gas flow to torch 100 can also be sloped up or down by changing the duty linearly over a certain prescribed time interval as opposed to a step change.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for controlling gas flow to a plasma arc torch, the method comprising the steps of:
   providing a plasma gas supply in communication with the plasma arc torch;
   regulating the pressure of the plasma gas supply using a pressure regulator;
   positioning a valve downstream in the flow of gas from the pressure regulator and between the plasma gas supply and the plasma arc torch so as to control the flow of plasma gas to the torch, the valve having an inlet and an outlet;
   ascertaining a frequency and duty cycle at which to cycle the valve between conditions of fully opened and fully closed based on the pressure provided to the valve inlet as determined by the pressure regulator;
   cycling the valve between conditions of fully opened and fully closed at the frequency and duty cycle provided by said step of ascertaining so as to provide a predetermined average gas pressure at the outlet of the valve; and
   maintaining a relatively constant flow of plasma gas to the plasma torch during said step of cycling the valve.

2. The method for controlling gas flow to a plasma arc torch as in claim 1, wherein said cycling step further comprises sending a step function signal to the valve.

3. The method for controlling gas flow to a plasma arc torch as in claim 2, further comprising the step of changing the flow of gas to the plasma torch by changing the duty of the signal over a predetermined time interval.

4. The method for controlling gas flow to a plasma arc torch as in claim 1, further comprising the step of regulating the pressure to an inlet of the valve to a predetermined value.

5. The method for controlling gas flow to a plasma arc torch as in claim 1, further comprising the step of dampening the flow of gas between the valve and the torch so as to reduce the size of fluctuations in the pressure of the gas supplied to the torch.

6. The method for controlling gas flow to a plasma arc torch as in claim 1, further comprising the step of measuring the pressure at an inlet of the valve.

7. The method for controlling gas flow to a plasma arc torch as in claim 1, wherein said maintaining step further comprises maintaining a relatively constant pressure of plasma gas at the torch.

8. A method for controlling gas flow to a plasma arc torch, the method comprising the steps of:
provdiing a plasma gas supply in communication with the plasma arc torch;
positioning a valve between the plasma gas supply and the plasma arc torch so as to control the flow of plasma gas to the torch, the valve having an inlet;
connecting the valve and the plasma arc torch with a gas hose;
determining the pressure of plasma gas provided to the valve inlet;
ascertaining a frequency and duty cycle at which to cycle the valve between conditions of fully opened and fully closed using the pressure of the plasma gas provided to the valve inlet from said step of determining;
cycling the valve, at the frequency and duty cycle provided by said step of ascertaining, between conditions of fully opened and fully closed; and
using a resistance to gas flow provided by the torch to maintain a relatively constant flow of plasma gas to the plasma torch during said step of cycling the valve.

9. The method for controlling gas flow to a plasma arc torch as in claim 8, wherein said cycling step further comprises sending a signal to the valve.

10. The method for controlling gas flow to a plasma arc torch as in claim 9, wherein the signal comprises a step function signal.

11. The method for controlling gas flow to a plasma arc torch as in claim 9, further comprising the step of providing a gas line between the valve and the plasma arc torch that does not include a pressure regulator.

12. The method for controlling gas flow to a plasma arc torch as in claim 9, further comprising the step of changing the flow of gas to the plasma torch by changing the duty cycle of the signal over a predetermined time interval.

13. The method for controlling gas flow to a plasma arc torch as in claim 8, where the valve is a solenoid valve.

14. The method for controlling gas flow to a plasma arc torch as in claim 8, further comprising the step of regulating the pressure to an inlet of the valve to a predetermined value.

15. The method for controlling gas flow to a plasma arc torch as in claim 8, further comprising the step of using the gas hose to dampen the flow of gas between the valve and the torch so as to reduce the size of fluctuations in the pressure of the gas at the torch.

16. The method for controlling gas flow to a plasma arc torch as in claim 8, wherein the gas hose in said step of connecting has an internal cross-sectional area and a length creating a volume in the gas hose that provides a dampening effect that reduces the size of fluctuations in the pressure of the gas provided to the torch during said step of cycling.

17. The method for controlling gas flow to a plasma arc torch as in claim 8, wherein said maintaining step further comprises maintaining a relatively constant pressure of plasma gas at the torch.

* * * * *